(12) United States Patent
Schaffer et al.

(10) Patent No.: US 10,297,092 B2
(45) Date of Patent: May 21, 2019

(54) SYSTEM AND METHOD FOR VEHICULAR DYNAMIC DISPLAY

(71) Applicant: Ford Global Technologies, LLC, Dearborn, MI (US)

(72) Inventors: Daniel Mark Schaffer, Brighton, MI (US); Kenneth James Miller, Canton, MI (US); Filip Tomik, Milford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/004,648

(22) Filed: Jan. 22, 2016

(65) Prior Publication Data
US 2017/0213401 A1 Jul. 27, 2017

(51) Int. Cl.
| | |
|---|---|
| *G07C 5/08* | (2006.01) |
| *G05D 1/00* | (2006.01) |
| *B60W 50/14* | (2012.01) |
| *B60W 40/08* | (2012.01) |
| *B60W 50/00* | (2006.01) |

(52) U.S. Cl.
CPC ........... *G07C 5/0816* (2013.01); *B60W 40/08* (2013.01); *B60W 50/14* (2013.01); *G05D 1/0061* (2013.01); *B60W 2040/0818* (2013.01); *B60W 2050/0089* (2013.01); *B60W 2050/146* (2013.01)

(58) Field of Classification Search
CPC ........ B60Q 9/00; B60Q 11/00; B60Q 11/005; B60K 2350/962; G07C 5/0816; G05D 1/0061; B60W 50/14; B60W 40/08; B60W 2050/146; B60W 2050/0089; B60W 2040/0818

USPC ... 701/22, 36, 48, 69, 31.4–31.6, 32.5, 32.7, 701/1, 41, 45, 70, 71; 340/438, 439, 441, 340/461, 905, 576
See application file for complete search history.

(56) References Cited

U.S. PATENT DOCUMENTS

| | | |
|---|---|---|
| 7,162,346 B2 | 1/2007 | Berry et al. |
| 7,796,019 B2 | 9/2010 | Yamada |
| 8,209,093 B2 | 6/2012 | Hill |

(Continued)

FOREIGN PATENT DOCUMENTS

| | | |
|---|---|---|
| EP | 1961606 A2 | 8/2008 |
| FR | 2958590 A3 | 10/2011 |

(Continued)

OTHER PUBLICATIONS

Search Report dated Jul. 5, 2014 for GB Patent Application No. GB1701049.7 (3 pages).

(Continued)

*Primary Examiner* — Nga X Nguyen
(74) *Attorney, Agent, or Firm* — Frank Lollo; Neal, Gerber & Eisenberg LLP; James P. Muraff (57) ABSTRACT

One example dynamic display system includes: (a) a vehicle including steering, an accelerator, brakes, sensors recording sensor data, a display, a processor, and memory; (b) a display program operatively coupled to the processor and configured to: determine a user hindrance rating based on the sensor data, and select instructions from a pool of instructions based on the hindrance rating and a user-selectable fidelity level, the pool of instructions including visual cues, and audio cues.

22 Claims, 7 Drawing Sheets

(56) References Cited

U.S. PATENT DOCUMENTS

| | | | |
|---|---|---|---|
| 8,447,460 B2* | 5/2013 | Nihei | B60K 23/0808 |
| | | | 701/29.2 |
| 8,718,862 B2 | 5/2014 | Gwozdek et al. | |
| 9,415,779 B2 | 8/2016 | Popham | |
| 9,440,659 B2 | 9/2016 | Kelly | |
| 9,646,428 B1* | 5/2017 | Konrardy | G07C 5/08 |
| 9,667,742 B2* | 5/2017 | Weng | H04L 67/32 |
| 2007/0182529 A1* | 8/2007 | Dobler | B60K 28/06 |
| | | | 340/438 |
| 2011/0087398 A1 | 4/2011 | Lu et al. | |
| 2012/0095659 A1 | 4/2012 | Rodrigues et al. | |
| 2012/0212353 A1* | 8/2012 | Fung | B60K 28/06 |
| | | | 340/905 |
| 2013/0224693 A1 | 8/2013 | Gilling et al. | |
| 2014/0156126 A1 | 6/2014 | Yung et al. | |
| 2014/0365070 A1 | 12/2014 | Yano et al. | |
| 2015/0210290 A1 | 10/2015 | Robert | |
| 2017/0101116 A1* | 4/2017 | Shubs, Jr. | B61L 27/04 |
| 2017/0305434 A1 | 10/2017 | Ratnasingam | |

FOREIGN PATENT DOCUMENTS

| | | |
|---|---|---|
| GB | 2534174 A | 7/2016 |
| KR | 1020090093146 A | 9/2009 |

OTHER PUBLICATIONS

Qu et al., "Choosing When to Interact With Learners", Proceedings of the 9th International Conference on Intelligent User Interfaces, Jan. 2004, pp. 307-309. (Year: 2004).

* cited by examiner

SYSTEM AND METHOD FOR VEHICULAR DYNAMIC DISPLAY

TECHNICAL FIELD

The present disclosure generally relates to a system and method for operating a dynamic display program on a vehicle.

BACKGROUND

Newer vehicles include a variety of drive features. Some drive features are only suitable under rare or specific circumstances. Because activation (or in some cases, deactivation) of these features is rarely proper, some users may be unfamiliar these features and, as a result, fail to apply them when proper.

SUMMARY

In various embodiments, various dynamic display systems and methods solve the above problems. One example dynamic display system includes: (a) a vehicle including steering, an accelerator, brakes, sensors recording sensor data, a display, a processor, and memory; (b) a display program operatively coupled to the processor and configured to: determine a user hindrance rating based on the sensor data, and select instructions from a pool of instructions based on the hindrance rating and a user-selectable fidelity level, the pool of instructions including visual cues, and audio cues.

One example dynamic display method for a vehicle having steering, an accelerator, a brakes, sensors recording sensor data, a display, a processor, and memory, includes: determining, via a display program operatively coupled to the processor, a user hindrance rating based on the sensor data, and selecting instructions, via the display program, from a pool of instructions based on the hindrance rating and a user-selectable fidelity level, the pool of instructions including visual cues, and audio cues.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or".

Figure 1A:
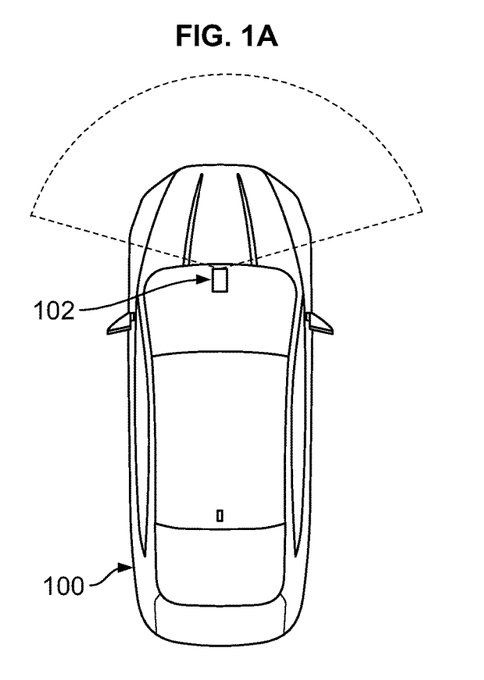
FIG. 1A is a top plan view of a vehicle of the present disclosure.

FIG. 1A shows a vehicle 100 in accordance with one embodiment. The vehicle 100 may be a standard gasoline powered vehicle, a hybrid vehicle, an electric vehicle, a fuel cell vehicle, or any other type of suitable vehicle. The vehicle 100 includes features (not shown) such as a dashboard, adjustable seats, one or more batteries, an engine or motor, a transmission, an HVAC system including a compressor and electronic expansion valve, a windshield, doors, windows, seatbelts, airbags, and tires. In some embodiments, the vehicle 100 is a sports utility vehicle or SUV. In other embodiments, the vehicle 100 is a sedan.

Figure 1B:
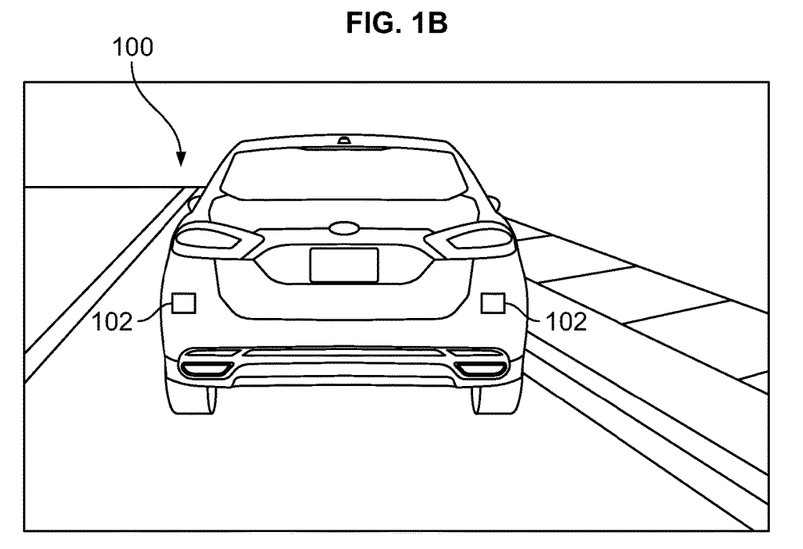
FIG. 1B is a rear perspective view of the vehicle of FIG. 1A.

Vehicle 100 may include sensors 102. The sensors 102 can be arranged in and around the car in a suitable fashion. The sensors can all be the same or different. There can be many sensors, as shown in FIGS. 1A and 1B, or only a single sensor. The sensors may include a camera, sonar, LiDAR, radar, an optical sensor, an ultrasonic sensor, or an infrared device configured to measure properties around the exterior of the vehicle, as indicated by the dashed line in FIG. 1A. Other sensors include gear sensors configured to detect gear engagement, accelerometers configured to detect acceleration, speed sensors, and torque sensors. Some sensors 102 may be mounted inside the passenger compartment of the vehicle 100, around the exterior of the vehicle, or in the engine compartment of the vehicle 100. At least one sensor 102 may be used to identify the vehicle's driver via facial recognition, speech recognition, or communication with a device, such as a vehicle key or mobile phone personal to the driver. The sensors may have an OFF state and various ON states. The vehicle 100, or a device operatively connected to the vehicle, may be configured to control the states or activity of the sensors. It should be appreciated that the term "internal sensors" includes all sensors mounted to the vehicle, including sensors that are mounted to an exterior of the vehicle.

Figure 2:
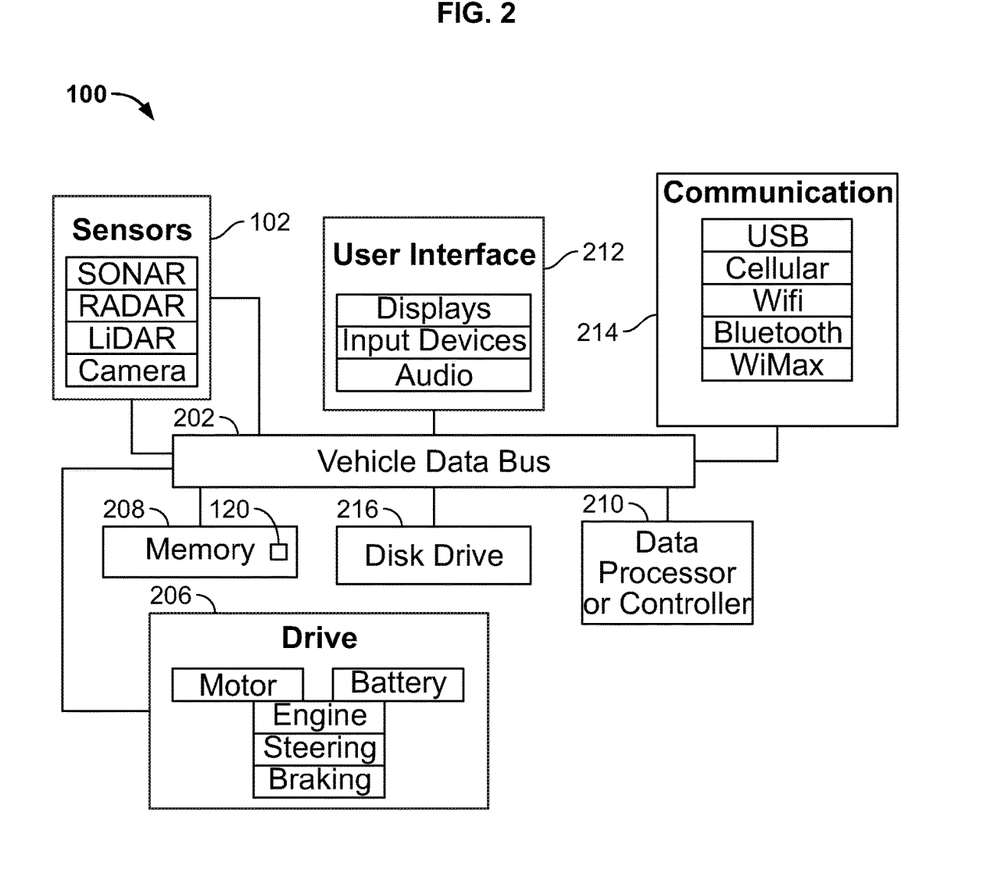
FIG. 2 is a block diagram illustrating electronic components of the vehicle of FIG. 1A.

As shown in FIG. 2, in one embodiment, vehicle 100 includes a vehicle data bus 202 operatively coupled to the sensors 102, vehicle drive devices 206, memory or data storage 208, a processor or controller 210, a user interface 212, communication devices 214, and a disk drive 216.

The processor or controller 210 may be any suitable processing device or set of processing devices such as, but not limited to: a microprocessor, a microcontroller-based platform, a suitable integrated circuit, or one or more application-specific integrated circuits (ASICs).

The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); read-only memory; a hard drive; a solid state hard drive; or a physical disk such as a DVD. In an embodiment, the memory includes multiple kinds of memory, particularly volatile memory add non-volatile memory.

The communication devices 214 may include a wired or wireless network interface to enable communication with an external network. The external network may be a collection of one or more networks, including standards-based networks (e.g., 2G, 3G, 4G, Universal Mobile Telecommunications Autonomous valet parking system (UMTS), GSM® Association, Long Term Evolution (LTE)™, or more); WiMAX; Bluetooth; near field communication (NFC); WiFi (including 802.11 a/b/g/n/ac or others); WiGig; Global Positioning System (GPS) networks; and others available at the time of the filing of this application or that may be developed in the future. Further, the external network(s) may be a public network, such as the Internet; a private network, such as an intranet; or combinations thereof, and may utilize a variety of networking protocols now available or later developed including, but not limited to, TCP/IP-based networking protocols. The communication devices 214 may also include a wired or wireless interface to enable direct communication with an electronic device, such as a USB or Bluetooth interface.

The user interface 212 may include any suitable input and output devices. The input devices enable a driver or a passenger of the vehicle to input modifications or updates to information referenced by the dynamic display program 120 as described herein. The input devices may include, for instance, a control knob, an instrument panel, a keyboard, a scanner, a digital camera for image capture and/or visual command recognition, a touch screen, an audio input device (e.g., cabin microphone), buttons, a mouse, or a touchpad. The output devices may include instrument cluster outputs (e.g., dials, lighting devices), actuators, a display (e.g., a liquid crystal display ("LCD"), an organic light emitting diode ("OLED"), a flat panel display, a solid state display, a cathode ray tube ("CRT"), or a heads-up display), and speakers. It should be appreciated that the term pressing a button or feature also includes pressing or activating a virtual button or feature, such as using a mouse to click on an item on a display, or pressing a virtual button on a touch screen.

The disk drive 216 is configured to receive a computer readable medium. In certain embodiments, the disk drive 216 receives the computer-readable medium on which one or more sets of instructions, such as the software for operating the methods of the present disclosure including dynamic display program 120 can be embedded. The instructions may embody one or more of the methods or logic as described herein. In a particular embodiment, the instructions may reside completely, or at least partially, within any one or more of the main memory 208, the computer readable medium, and/or within the processor 210 during execution of the instructions.

The term "computer-readable medium" should be understood to include a single medium or multiple media, such as a centralized or distributed database, and/or associated caches and servers that store one or more sets of instructions. The term "computer-readable medium" also includes any tangible medium that is capable of storing, encoding or carrying a set of instructions for execution by a processor or that cause a system to perform any one or more of the methods or operations disclosed herein.

In one embodiment, the vehicle 100 includes a dynamic display program 120 in the memory 208. When executed by the processor, the dynamic display program 120 generates or selects instructions for other elements of the vehicles to perform. In various embodiments, the dynamic display program is configured to direct instructions to the user interface 212, the communication devices 214, the vehicle drive 206, the sensors 102, the processor 210, and any other component operatively connected to the vehicle data bus 202. It should be appreciated that vehicle 100 may be fully autonomous or partially autonomous.

Figure 3:
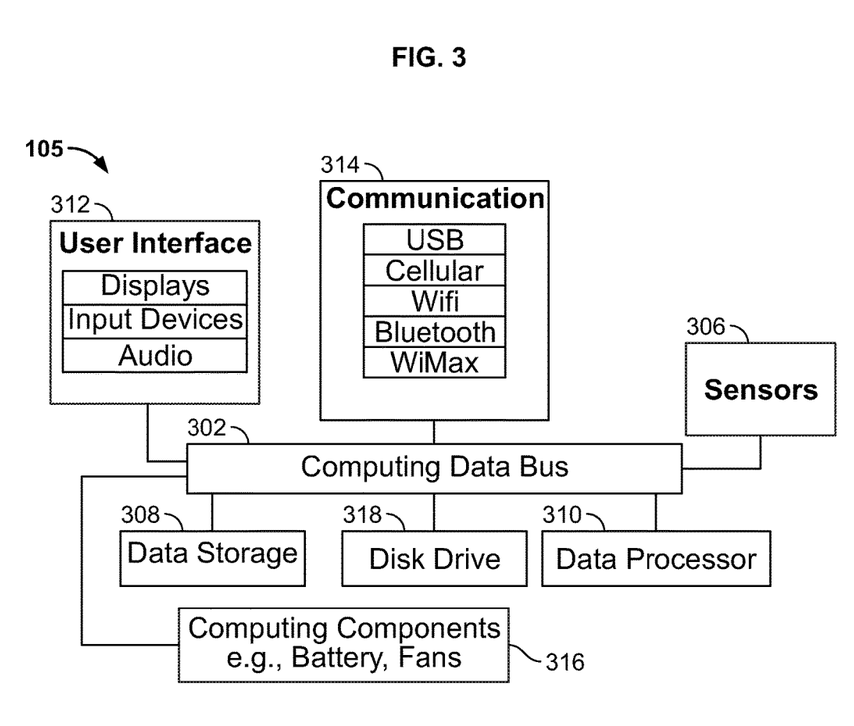
FIG. 3 is a block diagram illustrating electronic components of a computing device operatively connected to the vehicle of FIG. 1A.

In various embodiments, a computing device 105 is operatively connected to the vehicle 100 via any suitable data connection such as WiFi, Bluetooth, USB, or a cellular data connection. In one embodiment, shown in FIG. 3, the computing device 105 includes a data bus 302, operatively coupled to sensors 306, components 316, memory or data storage 308, a processor or controller 310, a user interface 312, and communication devices 314. It should be appreciated that the features of the computing device 105 may be similar to the features of the vehicle 100 as described above. For example, the communication devices 314 of the computing device 105 may operate similar to the communication devices 214 of the vehicle 100. The same applies to the user interface 312, the sensors 306, the data storage 308, the processor 310, and the disk drive 318. In various embodiments, the computing device 105 is a mobile phone or a server.

Turning now to FIGS. 4 to 10, various features and methods of the dynamic display program 120 are generally shown and illustrated.

Figure 4:
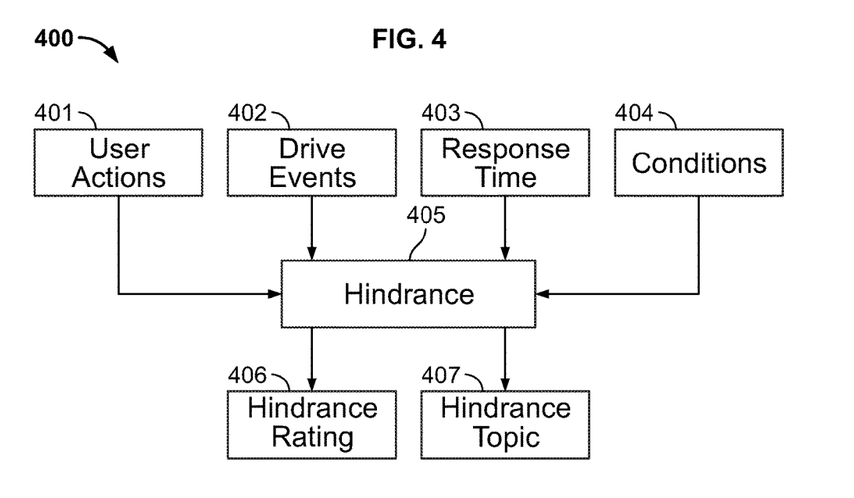
FIG. 4 is a block diagram of an example method of finding user hindrance with the dynamic display program.

With specific reference to FIG. 4, an example method 400 of calculating user hindrance 405 is generally shown and illustrated. More specifically, user hindrance 405 may be a function of various factors including user actions 401, drive events 402, response time(s) 403, and conditions 404.

The user actions 401 include acts performed by the user of the vehicle 100. The user actions 401 may include: an order or sequence in which the user has engaged various features by, for example, pressing buttons; a number of times in which the user has engaged a particular feature; a magnitude of engagement of a particular feature, for example, a magnitude of accelerator activation; a magnitude of the user's physical engagement level with the buttons or touch screens, for example, and a force with which the user has pressed a button or touch screen. In various embodiments, the user actions 401 include responses to prompts generated by the dynamic display program 120. For example, the dynamic display program 120 may display a prompt asking whether the vehicle is stuck.

The drive events 402 may include any status, property, or event of or related to the vehicle 100. In various embodiments, drive events 402 include vehicle position, vehicle orientation, vehicle speed, vehicle torque, vehicle acceleration, vehicle braking, vehicle oscillations, vehicle pulsations, vehicle wheel movement (including speed, torque, and orientation), gear selection, level of gear engagement, fuel level, content of displayed data, content of sound broadcast, hindrance 405, fidelity level 501, door opening, and any other event related to the vehicle that is capable of being sensed and recorded.

The response time 403 may include a time starting with one or more specific or predetermined user actions or predetermined drive events. For example, response time 403 may begin when a user presses a specific button three times in a row. In various embodiments, the dynamic display program 120 simultaneously counts multiple response times. In various embodiments, the dynamic display program 120 may compare the driver's measured response time 403 to an expected response time or an average response time. Based on the comparison (e.g., the driver is responding more quickly, more slowly, more often, or more erratically than expected or average), the dynamic display program 120 may determine the probability or magnitude of hindrance.

The conditions 404 may include any status or property of the user, the vehicle, or the outside world. In various embodiments, conditions 404 include weather (measured or downloaded), temperature, precipitation, kind of drive surface for each of the wheels, frictional constant of the drive surface for each of the wheels, time, day, health properties of the user including heart rate and level of alertness, a field of vision of the user, a position or location of the user, and an orientation of the user.

In various embodiments, the dynamic display program 120 factors in a degree or magnitude of contributing factors when performing its methods or functions.

The dynamic display program 120 may be configured to record the user actions 401, drive events 402, response time 403, and conditions 404 in a chart or database for assessment. The chart or database may associate each user action 401, drive event 402, response time, and condition 404 with a current time. A storage length of content in the database may be user-adjustable. For example, the user may choose for the dynamic display program 120 to only store content for to a user-selected length of time, a key cycle, an arbitrary number of key cycles, or permanently. Alternatively or in addition, the user may choose for the dynamic display program 120 to store an arbitrary number of most recent content via a first in-first out algorithm, such that new content causes oldest stored content to be erased from memory.

A frequency with which the user actions 401, drive events 402, response time 403, and conditions 404 are recorded may vary. In various embodiments, each category is recorded at a separate frequency. In various embodiments, each category is recorded at a predetermined frequency. In various embodiments, each category is recorded in response to a new user action 401, a new drive event 402, or a predetermined number of new entries in the chart or database.

In various embodiments, the user actions 401, the drive events 402, the response time 403, and the conditions 404 are evaluated, with one or more predetermined algorithms, to generate the hindrance 405 and more specifically, a hindrance rating 406 and a hindrance topic 407. Specific examples of predetermined algorithms are explained in greater detail below.

The hindrance rating 405 is a number or value that indexes the degree or level of customer confusion or frustration. A low hindrance rating 405, such as a rating of 1, indicates an absence of user confusion. A medium hindrance rating, such as a rating of 3, indicates some user confusion. A high hindrance rating, such as a rating of 5, indicates total user confusion. The hindrance rating 405 changes over time and more specifically, is reassessed in light of new user actions 401, drive events 402, response time 403, and conditions 404. In various embodiments, the hindrance rating 405 escalates with time.

The hindrance topic 407 is selected from a predefined plurality of hindrance topics. In some cases, the hindrance topics may be user-adjustable such that the user may contribute hindrance topics. In various embodiments, a manufacturer of the vehicle 100 is capable of editing, deleting, or adding hindrance topics. The selected hindrance topic 407 changes over time and more specifically, is reassessed in light of new user actions 401, drive events 402, response time 403, and conditions 404.

Each hindrance topic may correspond to a hindrance diagnosis and a hindrance solution. The diagnosis is a possible or likely source of the hindrance. The solution is a likely fix for the hindrance. The dynamic display program 120 performs the diagnostics based on inputs from the vehicle sensors. Based on those inputs, the dynamic display program determines a hindrance topic and hindrance factor. In various embodiments, each hindrance topic is associated with one or more diagnoses and one or more solutions. The dynamic display program 120 presents the solution via the user interface 212.

In various embodiments, the vehicle 100 may present a plurality of hindrance topics 407 to the user if the vehicle 100 cannot pick a specific hindrance topic 407 with sufficient certainty. In various embodiments, the degree of sufficient certainty is manufacturer or user adjustable. In various embodiments, the vehicle 100 may present, for user selection, a list of most likely hindrance topics 407 in light of the user actions 401, drive events 402, response time 403, and conditions 404.

Figure 5:
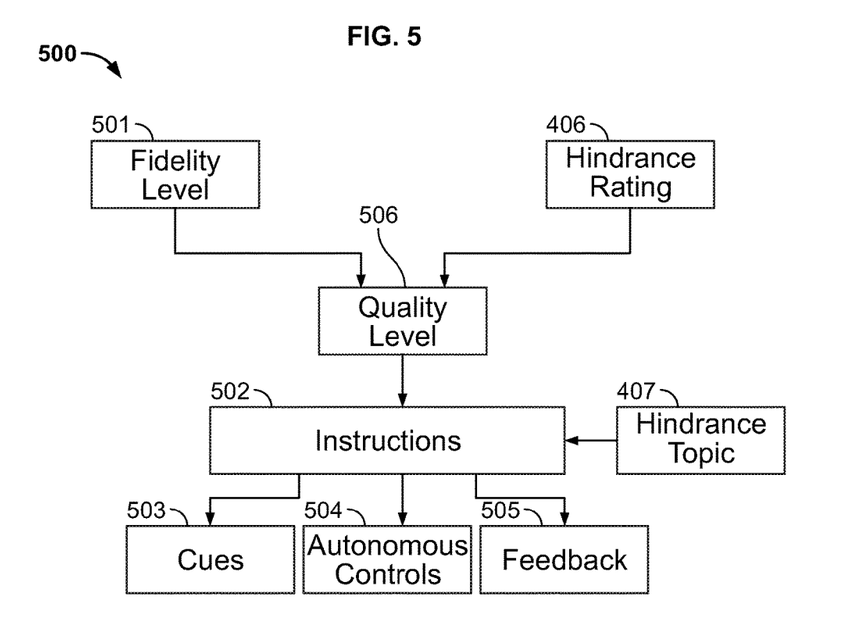
FIG. 5 is a block diagram of an example method of generating or selecting instructions with the dynamic display program.

Turning now to FIG. 5, a method 500 of applying the hindrance 405 to select or generate instructions 502 is generally shown and illustrated. Hindrance 405, and more specifically, in various embodiments, hindrance rating 406 is combined with a user-adjustable fidelity level 501 to determine a quality of presentation. The fidelity level 501 corresponds to a desired degree of assistance. For example, a fidelity level of 1 may correspond to zero desired assistance, no matter how serious the problem. A fidelity level of 5 may correspond to a maximum degree of desired assistance.

In various embodiments, the hindrance rating 406 is multiplied by or otherwise combined with the fidelity level 501 to determine a presentation quality level 506. For example, if the vehicle 100 calculates a hindrance rating of 3 and the user has selected a fidelity level of 5, then the quality of presentation level would be 15. In another example, if the vehicle 100 calculates a hindrance rating of 4 and the user has selected a fidelity level of 2, then the quality of presentation level would be 8.

In various embodiments, the dynamic display program 120 selects instructions 502 for presentation based on the presentation quality level 506 and the hindrance topic 407. In some cases, a plurality of instructions or a plurality of instruction sets may be associated with a hindrance topic 407. In these cases, the dynamic display program 120 may select the instructions or a set of instructions for presentation based on the presentation quality level 506. For example, a first set of low-detail instructions may correspond with a presentation quality level range of 6 to 14. A second set of medium or semi-detailed instructions may correspond to a presentation quality level range of 15 to 19. A third set of high detail instructions may correspond to a presentation quality level range of 20 to 24. A fourth set of even more extreme detail instructions may correspond to a presentation quality level of 25. In various embodiments, some of the instructions overlap between sets such that some instructions corresponding to one set are equivalent to, or the same as, instructions corresponding to another set.

Instructions 502 are commands generated or selected by the dynamic display program 120 that cause the various elements of the vehicle 100 (depicted in FIG. 2) to perform a particular function. Instructions include cues 503, autonomous vehicle control 504, and feedback 505. It should be appreciated that the instructions 502 may change across hindrance topics 407. It should be appreciated that instructions 502 may be selected from a pool of instructions.

Cues 503 include any sequence and combination of audio cues, visual cues, and haptic cues generated by the user interface 212. The audio cues may include alarms or spoken instructions, or any combination thereof. The visual cues may include text displays, video displays, photographic displays, lights, or any combination thereof. In various embodiments, low-key cues, such as a flashing light on the vehicle dashboard are associated with low presentation quality. In various embodiments, more distracting cues, such as training videos are associated with medium or high presentation quality. In various embodiments, highly distracting cues such as alarms or spoken commands are associated with medium or high presentation quality. In various embodiments, cues may also include virtual selectors or buttons pulled up on the vehicle display for immediate user selection. For example, a virtual button to deactivate the traction control may be included in a specific page of the user interface. In these embodiments, the dynamic display program 120 may present the virtual button on the presently displayed screen without requiring the user to page through the user interface.

It should be appreciated that the kinds of cues 503 may vary across hindrance topics 407, such that given a same quality level for hindrance topics A and B, a different set of cues are performed for hindrance topic A than for hindrance topic B. In various embodiments, the various cues for a given hindrance topic are designed or intended to cause the driver to perform the same ultimate act, such a gear change or feature selection. In various embodiments, the cues for a given hindrance topic are cumulative, such that a higher quality level results in extra cues. In various embodiments, the cues 503 across hindrance topics 407 have the same form, but different content (e.g., a first quality level range is always associated with blinking dashboard LEDs, a second quality level range is always associated with images on the dashboard, a third quality level range is associated with videos on the dashboard and an audio command).

Autonomous controls 504 include commands issued by the dynamic display program 120 that cause the vehicle to perform one or more drive events. In various embodiments, autonomous controls 504 include commands to brake, accelerate, open doors, change gears, and activate or deactivate driving features such as four wheel drive.

Feedback 505 includes data generated by the dynamic display program 120 and sent to an external server. In particular, the feedback 505 may include any of the user actions 401, drive events 402, response time 403, and conditions 404. In some embodiments, the feedback 505 includes all of factors 401 to 404 and is transmitted at a predetermined frequency. In various embodiments whether to transmit feedback 505 is a user-selectable option. In various embodiments, the frequency of transmission of feedback 505 is user-adjustable. In various embodiments, the frequency of transmission is based on the frequency with which the planning program 120 records or deletes the factors 401 to 404.

It should be appreciated that an external server, such as computing device 105, may, in some cases, run a polling program that automatically organizes feedback 505 from a plurality of vehicles 100. In some cases, the polling program is configured to display the organized information to a user, enabling the user to refine the hindrance topics 407 and the instructions 502 based on the feedback 505. In some embodiments, the polling program automatically refines the hindrance topics 407 and instructions 502 at least partially based on the feedback 505 collected from a plurality of vehicles.

FIGS. 6 to 9 generally illustrate various techniques or methods 600, 700, 800, and 900 that the dynamic display program 120 uses to select a specific hindrance topic 407. In various embodiments, the methods 600 to 900 correspond to a specific hindrance topic 407, and more specifically, cause the dynamic display program 120 to select a specific hindrance topic 407 from the plurality of hindrance topics. In various embodiments, methods 600 to 900 incorporate other factors, such any of the factors 401 to 404 in determining hindrance rating 406.

Figure 6:
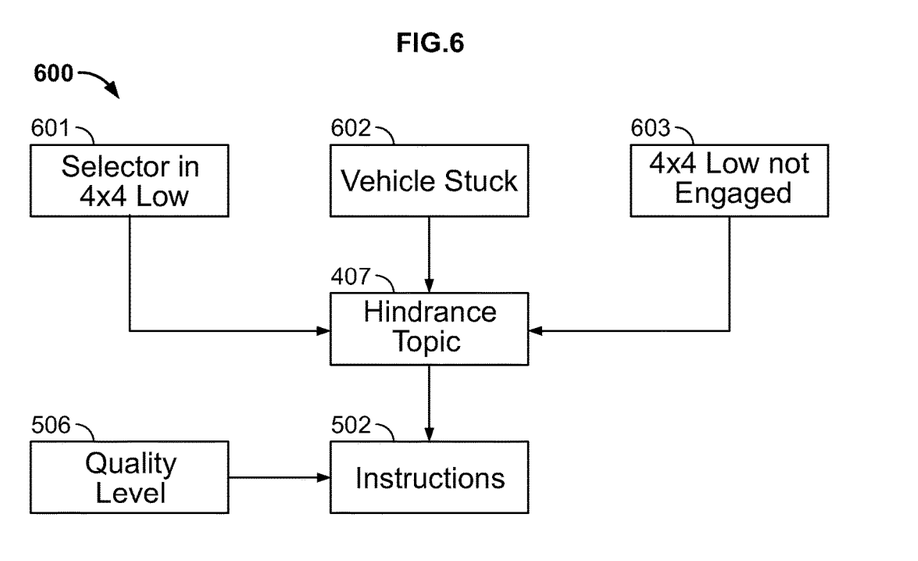
FIG. 6 is a block diagram of an example method of selecting a hindrance topic with the dynamic display program.

With reference to FIG. 6, a method 600 of instructing 4×4 low engagement or activation is generally shown and illustrated. In some embodiments, the vehicle 100 includes a 4×4 drive or four-wheel drive with "high" and "low" 4×4 options coupled with suitable selectors (e.g., a physical or virtual button). Suitable 4×4 drive systems and associated selectors are known in the art.

In some cases, the vehicle 100 must transition from 4×4 high to 4×4 low after a user has selected 4×4 low. More specifically, prior to physically transferring to or engaging 4×4 low, some vehicles require a user to (1) place the transmission into neutral, (2) press the 4×4 low selector, and (3) slightly depress and hold the accelerator pedal until 4×4 low is fully engaged. In some cases, a user may not understand that step (3) is required to fully engage 4×4 low. In some cases, step (3) is necessary to cause gear rotation and subsequent gear tooth alignment in order to resolve abutted gears.

The method 600 identifies and at least partially resolves this problem. More specifically, the method 600 detects (a) that the user selected 4×4 low 601, (b) that the vehicle is stuck 602 (i.e., is in a situation where 4×4 low could be useful), and (c) that the 4×4 low has not yet fully engaged 603. In various embodiments, the method 600 that the vehicle is stuck 602 by comparing individual wheel speeds against vehicle specific reference wheel speeds.

In response to the factors 601 to 603, the dynamic display program 120 may select a 4×4 low hindrance topic. The dynamic display program 120 may measure the magnitude of factors 601 to 603 and other factors, such as factors 401 to 404 in determining the hindrance rating 406. As discussed above, the quality level 506 is based on the hindrance rating 406 and the user selectable fidelity level 501.

The dynamic display program 120 selects instructions 502 in view of the quality level 506 and the hindrance topic 407. In various embodiments, the instructions 502 selected with the method 600 include an audio announcement for the user to press and hold the accelerator pedal. In various embodiments the instructions 502 selected with the method 600 also include autonomous activation of the accelerator pedal until the 4×4 low has fully engaged.

Figure 7:
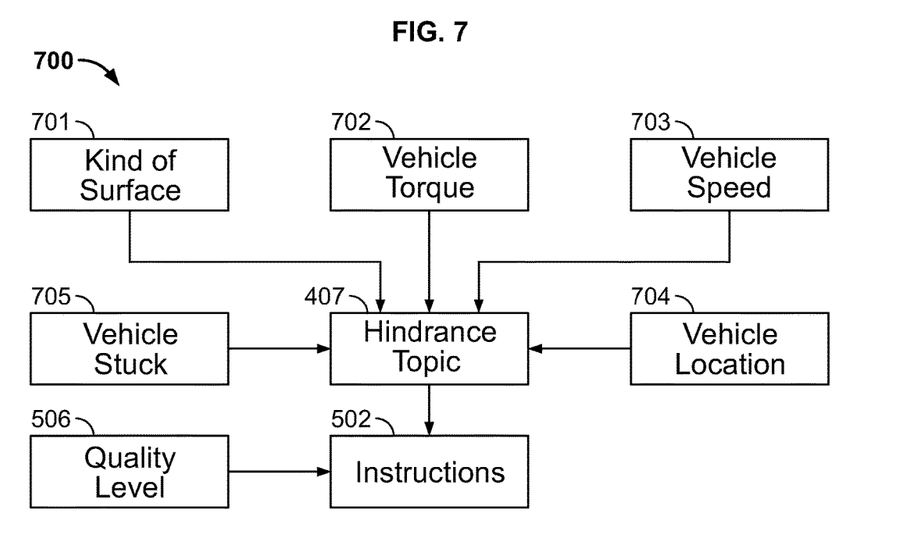
FIG. 7 is a block diagram of an example method of selecting a hindrance topic with the dynamic display program.

With reference to FIG. 7, a method 700 of instructing B-locker engagement is generally shown and illustrated. In various embodiments, the vehicle 100 includes an e-locker selector that locks a rear differential of the vehicle so that both rear wheels spin at the same speed. The e-locker is useful for off-roading, but can disadvantageously cause binding or undesirable performance on streets. Suitable e-locker systems and selectors are known in the art. In some cases, a user may not understand how or when to select the e-locker.

The method 700 of the dynamic display program 120 identifies and at least partially resolves this problem. More specifically, the method 700 detects (a) a kind of surface 701 below the vehicle (detected via vehicle sensors 102), (b) vehicle torque 702, (c) vehicle speed 703, (d) vehicle location 704, and (e) whether the vehicle is stuck 705.

In various embodiments, at a low quality level, the planning program 120 may display text identifying the e-locker and its added traction functionality. If, after ten seconds, the vehicle is still substantially stuck and the B-locker is still off, the planning program 120 may escalate to a medium quality level and instruct the user, via an audio command, that the e-locker is associated with a specific menu or button. In various embodiments, the planning program 120 may automatically display a virtual button or selector that enables the user to activate the e-locker. If, after another twenty seconds, the vehicle is still substantially stuck and the e-locker is off, the planning program may show a short video or clip or a user selecting the e-locker. After another thirty seconds, if still stuck, the vehicle may autonomously activate the e-locker.

Figure 8:
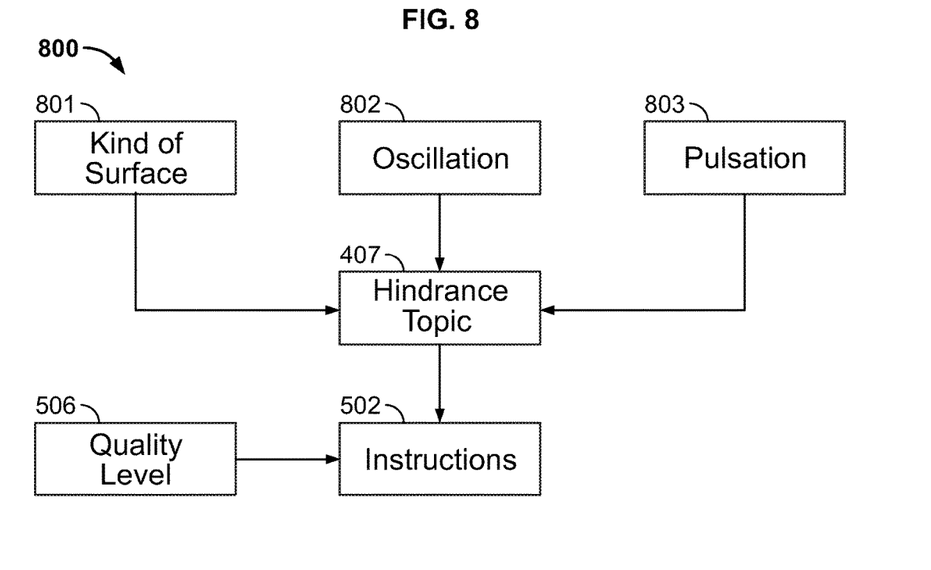
FIG. 8 is a block diagram of an example method of selecting a hindrance topic with the dynamic display program.

With reference to FIG. 8, a method 800 of instructing 4×4 high or all-wheel-drive (AWD) is generally shown and illustrated. In various embodiments, the vehicle 100 is configured to drive in both 4×4 high and AWD. Suitable configurations are known in the art. 4×4 high and AWD are intended for different surfaces. More specifically, 4×4 high performs best on off-road surfaces such as mud, sand, or rock crawl. AWD performs best on pavement or roads where road and weather conditions are changing or uncertain. In some cases, a user may be unaware of these differences between AWD and 4×4 high.

The method 800 of the dynamic display program 120 identifies and at least partially resolves these problems. More specifically, the method detects (a) a kind of surface 801 below the vehicle, (b) vehicle oscillation 802 (i.e., abnormal movement back and forth), and (c) vehicle pulsation 803 (i.e., abnormal vibration).

The dynamic display program 120 assesses these factors with a predetermined algorithm and determines whether 4×4 high or AWD is proper. More specifically, the dynamic display program 120 determines that 4×4 high is proper when the surface 801 is suitable for 4×4 high and the vehicle exhibits a specific pattern of oscillation 802, pulsation 803, or sustained slip (not shown) indicating that AWD is improper. Corresponding steps apply to determining that AWD is proper. The dynamic display program 120 issues instructions 502 accordingly.

Figure 9:
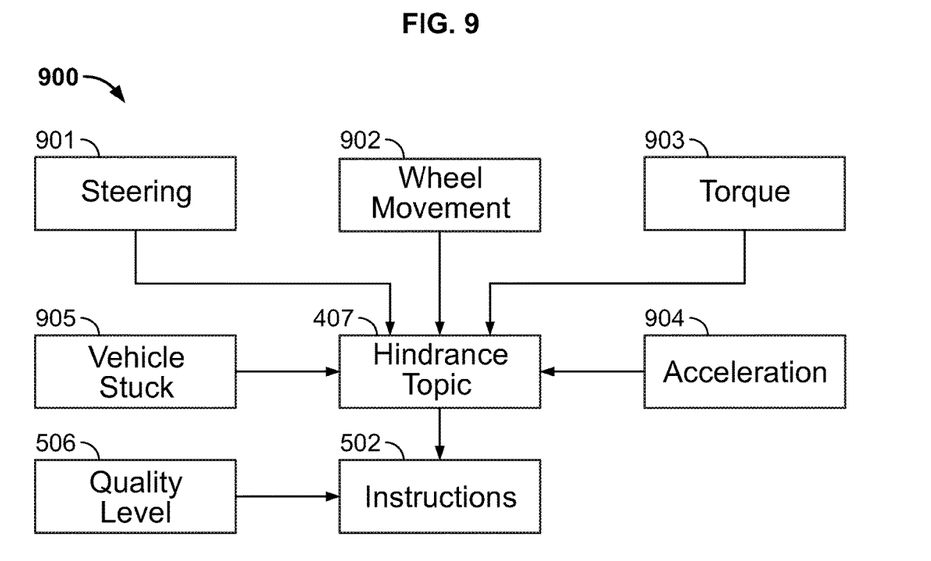
FIG. 9 is a block diagram of an example method of selecting a hindrance topic with the dynamic display program.

With reference to FIG. 9, a method 900 of instructing traction control and stability control is generally shown and illustrated. In various embodiments, the vehicle 100 is equipped with traction control and stability control. Suitable traction and stability systems are known in the art. Generally, traction control and stability control reduce engine torque to maintain control in icy conditions, making the features counter-productive when a vehicle is stuck. In some cases, a user may be unaware of these effects.

The method 900 of the dynamic display program 120 identifies and at least partially resolves these problems. More specifically, the method 900 detects (a) a user's steering, (b) wheel movement, (c) torque applied to the wheels, (d) a vehicle acceleration, and (e) whether the vehicle is stuck.

The dynamic display program 120 assesses these factors with a predetermined algorithm and determines whether traction control or stability control (or only one, or both) are proper. The dynamic display program 120 issues corresponding instructions. In various embodiments, the method 900 of the dynamic display program 120 identifies when only one of traction control and stability control has been deactivated and generates instructions informing the user that turning both off will enhance torque. In various embodiments, under sufficient circumstances, the dynamic display program 120 issues autonomous instructions 502 causing both of the traction control and the stability control to disengage until the vehicle is no longer stuck.

Figure 10:
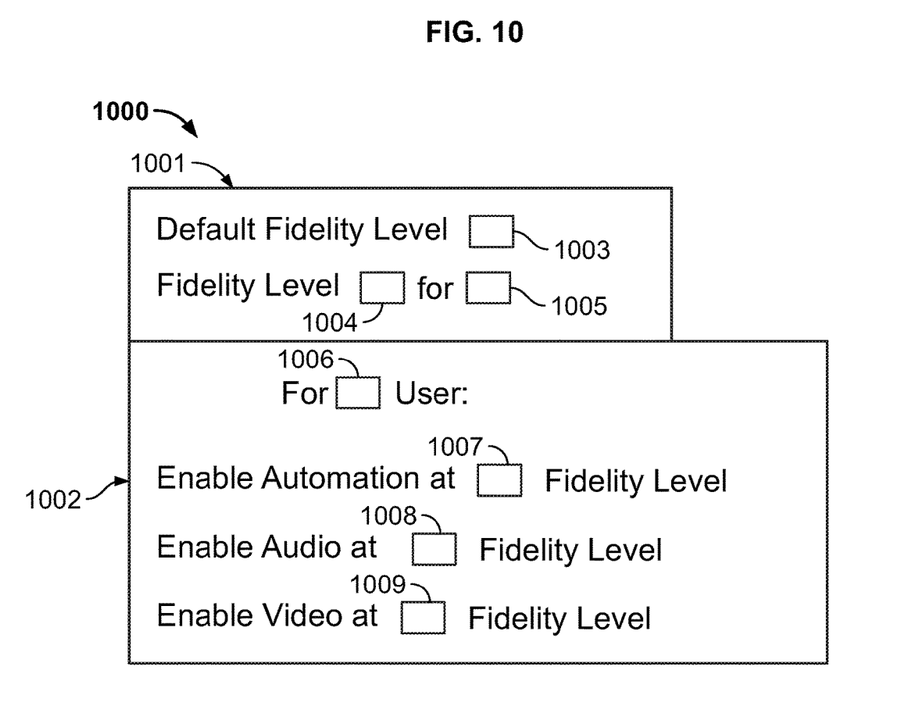
FIG. 10 is an example of a dynamic display program user interface.

Turning now to FIG. 10, an example user interface 1000 for adjusting options of the dynamic display program 120 is generally shown and illustrated. In various embodiments, the example user interface 1000 includes a default fidelity level setting 1003, a fidelity level setting 1004 for an identified user 1005 in a first sub-interface 1001. A second sub-interface 1002 includes more detailed options or settings for a specific user 1006. More specifically, the user may choose at what fidelity level (or in various embodiments, detail level) automation 1007, audio 1008, or video 1009 is enabled as a cue 503. At fidelity levels (or in those various embodiments, detail levels) falling below the selection, the corresponding cue is disabled.

It should be appreciated that for the purposes of the claims, a "loaded vehicle" is hereby defined to be a vehicle comprising a steering system, an acceleration system with an engine or motor, a braking system including brakes configured to decelerate the vehicle, wheels, wherein at least one of the wheels is configured to receive torque generated by the engine or motor, one or more seats, at least one processor, memory operatively coupled to the processor, and at least one display operatively coupled to the processor. It should be appreciated that the above definition applies, and only applies, when the claims specifically include the term "loaded vehicle."

The above-described embodiments, and particularly any "preferred" embodiments, are possible examples of implementations and merely set forth for a clear understanding of the principles of the invention. Many variations and modifications may be made to the above-described embodiment (s) without substantially departing from the spirit and principles of the techniques described herein. All modifications are intended to be included herein within the scope of this disclosure and protected by the following claims.

The invention claimed is:

1. A vehicle comprising:
   sensors;
   a display;
   a user interface associated with vehicle features; and
   a processor configured to:
      determine, via the sensors, a level of confusion for using the user interface;
      receive a user-selected fidelity level corresponding to a desired degree of assistance; and based on the level of confusion and the user-selected fidelity level, select one of a plurality of instructions for using the user interface; and present selected instruction on the display.

2. The vehicle of claim 1, wherein the processor is further configured to select a user hindrance topic based on sensor data recorded by the sensors; and wherein the user hindrance topic identifies a source of confusion for the driver.

3. The vehicle of claim 1, wherein the processor is further configured to combine the level of confusion and the user-selected fidelity level into a quality level and subsequently select one of the plurality of instructions based on the quality level.

4. The vehicle of claim 1, wherein the plurality of instructions include autonomous controls performed by the vehicle.

5. The vehicle of claim 2, wherein the processor is further configured to select the plurality of instructions based on the user hindrance topic.

6. The vehicle of claim 1, wherein the processor is further configured to track determined user hindrances from other vehicles.

7. The vehicle of claim 2, wherein the processor is further configured to select a first hindrance topic in response to detecting, for a predetermined time span, that a 4×4 low option has been selected and a 4×4 low drive has not engaged.

8. The vehicle of claim 7, wherein the processor is further configured to select a second hindrance topic at least partially in response to detecting that the vehicle has been stuck for the predetermined time span.

9. The vehicle of claim 8, wherein the processor is further configured to select a third hindrance topic at least partially in response to measured vehicle oscillation and measured vehicle pulsation.

10. The vehicle of claim 9, wherein the processor is further configured to select a fourth hindrance topic in response to determining that traction control is unsuitable for current conditions.

11. A method of operating a vehicle, the method comprising:

determining, via a processor, a level of confusion for using a user interface associated with a vehicle feature based on sensor data recorded via sensors;

receiving, at the processor, a user-selected fidelity level corresponding to a desired degree of assistance; and based on the level of confusion and the user-selected fidelity level, selecting, via the processor, one of a plurality of instructions for using the user interface; and presenting selected instruction on a vehicle display.

12. The method of claim 11, further comprising selecting, via the processor, a user hindrance topic based on the sensor data, wherein the user hindrance topic identifies a source of confusion for the driver.

13. The method of claim 12, further comprising selecting, via the processor, one of the plurality of instructions based on the user hindrance topic.

14. The method of claim 12, further comprising:

selecting, via the processor, a first hindrance topic in response to detecting, for a predetermined time span, that a 4×4 low option has been selected and a 4×4 low drive has not engaged;

selecting, via the processor, a second hindrance topic at least partially in response to detecting that the vehicle has been stuck for the predetermined time span;

selecting, via the processor, a third hindrance topic at least partially in response to measured vehicle oscillation and measured vehicle pulsation; and selecting, via the processor, a fourth hindrance topic in response to determining that traction control is unsuitable for current conditions.

15. The vehicle of claim 1, wherein the fidelity level includes a range between a minimum value that corresponds to no desired assistance and a maximum value that corresponds to a maximum degree of desired assistance.

16. The vehicle of claim 1, wherein the level of confusion includes a range between a minimum value that corresponds to an absence of user confusion and a maximum amount that corresponds to a maximum amount of user confusion, the range including a medium value that corresponds a medium amount of user confusion.

17. The vehicle of claim 1, wherein the user hindrance rating is updated based upon additional sensor data recorded by the sensors over time.

18. The vehicle of claim 1, further comprising a different user interface to present said instruction to a driver of the vehicle.

19. The vehicle of claim 2, further comprising a different user interface that presents a list of potential hindrance topics for selection by a driver of the vehicle when the processor is unable to select the user hindrance topic with threshold level of certainty, wherein the processor selects the list of the potential hindrance topics based upon the sensor data.

20. The vehicle of claim 1, further comprising an input device, wherein the sensors measure a magnitude of a user's physical engagement level with the input device while the vehicle feature is being used, wherein the level of confusion is based at least in part on the user's physical engagement level.

21. The vehicle of claim 1, wherein each of the plurality of instructions includes different magnitude of quality and detail for presenting said instruction.

22. The vehicle of claim 1, wherein the level of confusion is determined based at least in part on order, sequence, magnitude, and frequency in which the user interface is physically engaged by a user.

* * * * *